US012512281B2

(12) United States Patent
Ruff

(10) Patent No.: US 12,512,281 B2
(45) Date of Patent: Dec. 30, 2025

(54) DEVICE FOR DETECTING A KEYSTROKE OF A KEY MODULE, KEYBOARD AND METHOD FOR DETECTING A KEYSTROKE OF A KEY MODULE

(71) Applicant: CHERRY EUROPE GMBH, Auerbach (DE)

(72) Inventor: Eduard Ruff, Auerbach (DE)

(73) Assignee: CHERRY EUROPE GMBH, Auerbach (DE)

( * ) Notice: Subject to any disclaimer, the term of this patent is extended or adjusted under 35 U.S.C. 154(b) by 0 days.

(21) Appl. No.: 17/499,489

(22) Filed: Oct. 12, 2021

(65) Prior Publication Data

US 2022/0122787 A1 Apr. 21, 2022

(30) Foreign Application Priority Data

Oct. 15, 2020 (DE) ........................ 102020127246.4

(51) Int. Cl.
*H01H 13/70* (2006.01)
*H01F 38/14* (2006.01)
(Continued)

(52) U.S. Cl.
CPC ............ *H01H 13/70* (2013.01); *H01F 38/14* (2013.01); *H01H 13/14* (2013.01); *H01H 13/20* (2013.01)

(58) Field of Classification Search
CPC ........ H01H 13/70; H01H 13/14; H01H 13/20; H01H 2239/024; H01H 3/125;
(Continued)

(56) References Cited

U.S. PATENT DOCUMENTS 8,259,456 B2 * 9/2012 Rosenau ................ H03K 17/97 361/752
9,983,689 B2 * 5/2018 Ikeda ..................... H01H 13/70
(Continued)

FOREIGN PATENT DOCUMENTS

DE 10 2015 204 440 A1 9/2016
DE 10 2015 120 607 A1 6/2017
NL 2024906 2/2020

OTHER PUBLICATIONS

Office Action as received in German Application No. 102020127246.4 dated Jul. 20, 2021 [no English translation available].
(Continued)

*Primary Examiner* — Lheiren Mae A Caroc
(74) *Attorney, Agent, or Firm* — Keller Preece PLLC

(57) ABSTRACT

A device for detecting a key press of a keyboard, including a key module, a circuit substrate, a planar coil arranged on or in the circuit substrate, and at least one damping element, wherein the at least one damping element for damping the planar coil is movably arranged in the key module between a rest position and an actuation position, wherein the damping element executes a first actuating movement during the movement in the direction of the actuation position and executes a second actuating movement during the movement towards the rest position, and wherein the device outputs at least one electrical signal when carrying out the first actuating movement and/or the second actuating movement. A keyboard including one or more such devices and to a method for detecting a key press of a key module with such a device.

14 Claims, 4 Drawing Sheets

(51) Int. Cl.
*H01H 13/14* (2006.01)
*H01H 13/20* (2006.01)

(58) Field of Classification Search
CPC .................. H01H 13/705; H01F 38/14; H03K 2017/9706; H03K 17/972; G01R 31/3277
See application file for complete search history.

(56) References Cited

U.S. PATENT DOCUMENTS

| | | | | |
|---|---|---|---|---|
| 10,574,233 | B2 * | 2/2020 | Casparian | H01F 7/0226 |
| 11,545,319 | B2 * | 1/2023 | Knops | H01H 13/7073 |
| 2021/0272760 | A1 | 9/2021 | Knops | |

OTHER PUBLICATIONS

"Analog Cherry MX switch" imgur, posted Sep. 24, 2018, by user "pawnerd". Retrieved from Internet: <https://imgur.com/gallery/analog-cherry-mx-switch-imrH7nO> on Jul. 1, 2024.

* cited by examiner

DEVICE FOR DETECTING A KEYSTROKE OF A KEY MODULE, KEYBOARD AND METHOD FOR DETECTING A KEYSTROKE OF A KEY MODULE

CROSS-REFERENCE TO RELATED APPLICATIONS

This application claims the benefit of German Application No. 10 2020 127246.4, filed Oct. 15, 2020.

BACKGROUND OF THE INVENTION

1. Technical Field

The invention relates to a device for detecting a key press of a key module of a keyboard, to a keyboard comprising one or more such devices, and to a method for detecting a key press of a key module.

2. Background and Relevant Art

A wide variety of types and designs of key modules are used in keyboards. The structural design and the generation of a signal that signals the actuation of a key, for example, are substantial influencing factors on the quality of a key module and thus a keyboard.

Most of the commercially available key modules belong to the so-called mechanical key modules. The following contact system has proven itself for a long time: During the actuation of the key module, two metallic contact surfaces touch each other, which results in a short circuit and triggers a switching signal.

The disadvantage of conventional mechanical key modules is that material wear, in particular mechanical abrasion on the contact surfaces, is unavoidable. As a result, the longer the key modules are used, the more incorrect switching occurs. A break in the contact surfaces has a particularly disadvantageous effect on the functionality of the key modules.

A further disadvantage of a mechanical key module is that only one switching point is provided when it is actuated, i.e. exactly one signal is triggered at a specific point per actuation. Different applications, for example text capture on the one hand and games on the other, would be easier to use if the switching point of the key module was at a different point in the actuating movement, i.e. the signal was triggered sooner or later. It would therefore be desirable to be able to adjust the switching point so that a key module and thus a keyboard can be optimally used for various applications.

Another disadvantage of mechanical key modules is that only one signal is triggered per actuation. A variable signal, in individual steps or in finely graduated steps or also steplessly, is therefore not possible. Many applications, for example in games, however, require a so-called joystick function, for example to be able to control objects at variable speeds.

SUMMARY

The invention is therefore based on the object of specifying a device and a method for detecting a key press of a key module of a keyboard, which apparatus or method, compared to the conventional mechanical key modules, allows a longer service life with substantially constant switching quality.

This object is achieved by a device with the features of claim 1, a keyboard with the features of claim 10, and a method with the features of claim 12. Advantageous embodiments and developments are provided in each of the dependent claims.

The device according to the invention for detecting a key press of a keyboard comprises a key module, a circuit substrate, a planar coil arranged on or in the circuit substrate, and at least one damping element. For damping the planar coil, the at least one damping element is movably arranged in the key module between a rest position and an actuation position. The movement path of the damping element between the rest position and the actuation position can be, for example, between 2 and 6 mm, preferably 3 to 5 mm, in particular it is approximately 4 mm.

The damping element executes a first actuating movement when moving in the direction of the actuation position and a second actuating movement when moving in the direction of the rest position. The device according to the invention outputs at least one electrical signal, for example an electrical switching signal, when carrying out the first actuating movement and/or the second actuating movement.

A circuit substrate is understood to mean, for example, a printed circuit board, a circuit board, a circuit film, a stamped part, or some other substrate with applied and/or integrated conductor tracks.

The key module has, for example, a housing and a plunger that is movable relative to the housing. The plunger is movable between a starting position and a pressed position, the movement usually being in a straight line. Typically, the plunger is held in its starting position by a resilient means, for example a spring, in particular a compression spring. A key cap for actuation by an operator can be arranged at a free end of the plunger. When the operator presses the key cap, the plunger is moved from its starting position in the direction of the pressed position, the resilient means being tensioned in the process. Without pressure from an operator, the plunger is moved back towards the starting position by the tensioned resilient element. In the starting position of the plunger, the damping element is in its rest position; in the pressed position of the plunger, the damping element is in its actuation position.

A capacitor is preferably assigned to the planar coil, which capacitor can be arranged on or in the circuit substrate, but also outside the circuit substrate. The planar coil and the capacitor form an LC resonance circuit. The LC resonance circuit is operated with alternating voltage, for example 16 MHz. The impedance of the planar coil, the capacitance of the capacitor, and the frequency are matched, for example, in such a way that the LC resonance circuit is located on a flank of the resonance curve when the damping element is in its rest position. When the damping element approaches the planar coil (first actuating movement), the impedance of the planar coil is changed and the LC resonance circuit is adjusted. The oscillation amplitude changes due to the change in impedance. This changes the current flow through the LC resonance circuit. The change in the current flow can be detected, for example, by changing the voltage drop.

The planar coil or the LC resonance circuit on the one hand and the damping element on the other hand together form, for example, an inductive proximity switch that signals an approach or distancing of the damping element to the planar coil.

The device according to the invention is preferably provided as part of a keyboard. The circuit substrate of the device is arranged in a frame or housing of the keyboard. A key module and a planar coil are arranged in or on the circuit substrate, wherein the planar coil can be arranged in a plurality of alternative embodiments, for example on an upper side of the circuit substrate on which the key module is also arranged or which faces the key module, or on an underside opposite the upper side or—in the case of a multilayer structure of the circuit substrate—within the circuit substrate. In addition to the planar coil and the capacitor mentioned above, further, in particular electrical or electronic components, can be provided in and/or on the circuit substrate.

The advantages of the device according to the invention are, in particular, that the interaction of the planar coil or LC resonance circuit on the one hand and the damping element on the other hand allows a contactless triggering of at least one signal during an actuating movement of the damping element, which movement is usually performed by an operator of the keyboard or by a resilient means for resetting a key actuation by the operator. There is no need to touch contact surfaces with conventional key modules, and the detection of the key operation takes place without contact. This means that there is no material wear or mechanical abrasion of the contact surfaces or also breakage and the associated faulty switching. The invention thus makes it possible to manufacture key modules and thus also keyboards with less susceptibility to interference and an increased service life compared to conventional key modules. Furthermore, the non-contact output of the signal allows a qualitatively constant switching process; there are no changes, for example to the switching point or the switching reliability, due to mechanical abrasion or wear or breakage of the contact surfaces.

The rest position of the damping element preferably corresponds to the already mentioned starting position of the plunger of the key module, in which the plunger and thus the key module are in an unactuated state. The plunger can assume the starting position, for example, with the aid of one or more resilient means, for example a spring, in particular a compression spring, without external action. The actuation position of the damping element preferably corresponds to a pressed position of the plunger of the key module, which is assumed when an external force acts on the plunger of the key module, in particular the key is pressed by an operator.

While the first actuating movement and the second actuating movement of the damping element are being carried out, the planar coil is damped and the aforementioned signal is triggered and/or output and/or changed, for example when a predetermined threshold value is reached or exceeded (change limit value). The first and second actuating movements can be limited by a mechanical component, in particular a stop element, when the actuation position or the rest position is reached.

A further development provides that the device comprises at least one control and/or monitoring device for detecting and/or processing at least one physical parameter of the planar coil, which parameter changes during the damping by the damping element. The control and/or monitoring device is set up in such a way that the at least one electrical signal is output when at least one change limit value for the physical parameter is reached or exceeded. As an alternative or in addition, the control and/or monitoring device can also be set up in such a way that the signal strength of the at least one electrical signal changes as a function of the change in the physical parameter. The physical parameter can be an electrical voltage, an electrical current strength, or a frequency. Among other things, all measurable parameters of an LC resonance circuit can be understood by it.

The change limit value can be a common change limit value that works for both the first and the second actuating movement. However, it is also possible to specify two or more different change limit values, for example a first change limit value that works with the first actuating movement and a second change limit value that works with the second actuating movement.

The change limit values mentioned can be fixed. However, it is also possible for the change limit value or the change limit values to be adjustable. This has the advantage that the so-called switching point, i.e. the exact position of the actuation element and thus of the plunger of the key module during the corresponding actuating movement during which the at least one electrical signal is output, can be changed and thus adjusted without mechanical changes to the key module. Thus, the operator of the keyboard can individually adjust the desired switching point of the keys on his keyboard without—as before—having to buy new key modules. For example, the same keyboard can be used for gaming and office applications, only the switching point has to be changed, if desired. A manufacturer can also provide a uniform keyboard model for different applications and preset the switching point differently for the corresponding application.

The control and/or monitoring device can alternatively or additionally also be set up in such a way that the signal strength of the at least one electrical signal is dependent on the position of the damping element in the key module. For example, a variable signal can be output in individual steps or in finely graduated steps or also steplessly. This is possible, for example, if the actuating movement of the damping element takes place in such a way that the aforementioned physical parameter of the planar coil or of the LC resonance circuit comprising the planar coil changes constantly during the movement, in particular continuously and/or steplessly. The control and/or monitoring device can then be set up in such a way that the at least one electrical signal is output steplessly or in finely graduated steps or in individual steps during the actuating movement of the damping element, preferably with a change in the signal strength which is correspondingly stepless or finely graduated or which is carried out in individual steps.

In this way, a so-called joystick function can be implemented for keys, at least for one or individual or all keys on a keyboard, which opens up a wide range of new application possibilities in particular in the gaming sector, but also in office applications and other applications, for example when scrolling through documents, tables, and websites at variable speeds or when controlling objects at variable speeds.

The aforementioned options for adjusting the switching points of the individual key modules and thus keys and/or implementing a joystick function also have the advantage that keyboards can be recalibrated over time. Mechanical, electromechanical, and electronic components can wear out and/or change their properties due to aging. In the case of key modules and keyboards, for example, this can result in the switching points and/or the assignment of movement positions of the damping element to output signals or signal strengths changing; if necessary, specific functions can even be omitted entirely due to adjustment effects. In the aforementioned control and/or monitoring device, an assignment of the physical parameter to the strength of the electrical signal output or a definition of one or more change limit values can be provided. This assignment can be adapted if necessary, for example due to the aforementioned wear and aging effects. In this way, for example, each individual key module and/or the entire keyboard can be recalibrated, i.e.

the initial state is at least largely restored. For example, this can be done each time the keyboard is switched on and/or by entering specific commands and/or by using specific key combinations. In this way, for example, the aging of components over the course of their service life can be compensated for. In an analogous manner, manufacturing tolerances or tolerance-related differences in the key modules and/or keyboards can be compensated for by appropriate calibration or adjusting.

One embodiment of the invention provides that the planar coil comprises at least one winding. Alternatively or additionally, the planar coil can be arranged on an upper side and/or an underside of the circuit substrate. The upper side is preferably the side or surface of the circuit substrate to which the key module is also attached or which faces the key module. The underside is correspondingly that side or surface which faces away from the key module. The planar coil can also be arranged between at least two layers within a multilayer circuit substrate. A winding is understood to mean, in particular, a complete winding. In particular, the winding has at least largely a circular or oval shape or also an angular shape, for example a rectangular shape, for example with rounded corners. In the case of the planar coil, the plurality of windings that may be present preferably lie in one plane, i.e. the coil wire lies in one plane and the windings thus have different dimensions in this plane and are arranged one inside the other in this plane. Correspondingly, the planar coil optionally comprising numerous windings can also have a circular or ring shape or an oval shape or an angular shape, for example a rectangular shape, optionally with rounded corners. A plurality of windings of a planar coil can also run into one another in a spiral shape.

The planar coil can be arranged as a printed circuit on the upper side and/or underside of the circuit substrate or also within the circuit substrate. Furthermore, the planar coil can be implemented as a metallized film or as a stamped metal plate (stamped part).

In particular, it can be provided according to the invention that the damping element consists of a ferromagnetic or paramagnetic material or at least in some regions comprises a ferromagnetic or paramagnetic material. The damping element can, for example, be a bent metal part.

The ferromagnetic or paramagnetic material can also be applied as a coating, for example on plastics material.

One embodiment of the invention provides that the damping element forms a horizontal surface which, in the actuation position, is aligned parallel to the circuit substrate and/or to the planar coil. In this context, "parallel" is understood to mean any largely parallel alignment, i.e. in particular manufacturing tolerances are also comprised. The planar coil forms a flat plane on the circuit substrate. The horizontal surface of the damping element is thus aligned parallel to this planar plane of the planar coil, which is advantageous for the damping of the planar coil by the damping element. Furthermore, the horizontal surface of the damping element can also be aligned parallel to the circuit substrate and/or to the planar coil in the rest position and also during the entire first and/or second actuating movement. The horizontal surface can be a surface of a damping element in the form of a bent metal part or a surface of the plunger if it is in the form of a damping element and/or is coated accordingly.

According to a further development, the damping element forms at least one further surface which extends perpendicularly or obliquely, i.e. at an acute or obtuse angle, to the horizontal surface. As a result, the damping element forms a three-dimensional body that is moved in the magnetic field of the planar coil and thus causes a greater change in the impedance of the planar coil and thus a greater effect, in particular with regard to the change in the physical parameter, than a flat, at least substantially two-dimensional body with the same movement distance.

According to one embodiment, the damping element can be moved perpendicular to the circuit substrate and/or to the planar coil during the first and second actuating movements. The damping element is preferably at a greater distance from the planar coil in the rest position than in the actuation position. Thus, a distance between the horizontal surface of the damping element and the circuit substrate and/or the planar coil changes during the vertical movement of the damping element. During the first actuating movement, the damping element approaches the planar coil and the distance decreases continuously. During the second actuating movement, the damping element moves away from the planar coil, and the distance increases continuously.

One embodiment of the invention provides that the damping element is a plunger of the key module or the damping element is arranged and/or formed on a plunger of the key module. If the damping element is also the plunger of the key module, the plunger itself can comprise a ferromagnetic or paramagnetic material. This can be at least in some regions or completely formed on the plunger, for example in the form of a metallic coating. If the damping element is arranged on the plunger, the damping element is in particular a separate component, which is preferably at least in some regions made of a ferromagnetic or paramagnetic material or is coated with such a material. If the damping element is formed on the plunger, it can be, for example, a coating, in particular a coating consisting of a ferromagnetic or paramagnetic material or comprising a ferromagnetic or paramagnetic material.

The plunger is movably arranged in the key module. The movement of the plunger, for example triggered by a key press by an operator of the keyboard, represents the first or second actuating movement of the damping element (if the plunger is the actuation element) or corresponds to the first or second actuating movement of the damping element (if this is arranged and/or formed on the plunger). A distance between the plunger and the circuit substrate and/or planar coil can decrease or increase during the movement. The damping element, which can be the plunger itself or can be arranged and/or formed on the plunger, moves with the plunger and thereby executes the first or second actuating movement. Thus, the distance between the damping element and the circuit substrate and/or the planar coil is correspondingly reduced or increased, as a result of which the planar coil is damped. The actuating movement is preferably carried out at least largely perpendicular to the circuit substrate.

Another embodiment provides that the key module comprises a plunger and an auxiliary actuator. In this embodiment, the damping element is either the auxiliary actuator itself and/or the damping element is arranged and/or formed on the auxiliary actuator. The plunger and the auxiliary actuator are movably arranged in the key module. By means of a movement of the plunger, a movement of the auxiliary actuator is triggered. The movement of the auxiliary actuator is the first or second actuating movement of the damping element (if the auxiliary actuator is the actuation element) or the movement of the auxiliary actuator corresponds to the first or second actuating movement of the damping element (if this is arranged and/or formed on the auxiliary actuator).

The function of the auxiliary actuator is to absorb a force which is exerted on the plunger by an operator by a key press or by a resetting element and which results in its movement, and also to convert it into a movement. A distance between the auxiliary actuator and the circuit substrate and/or planar coil can decrease or increase during the movement. The damping element, which can be the auxiliary actuator itself or can be arranged and/or formed on the auxiliary actuator, moves with the auxiliary actuator and thereby executes the first or second actuating movement. Thus, the distance between the damping element and the circuit substrate and/or the planar coil is correspondingly reduced or increased, as a result of which the planar coil is damped. The actuating movement is preferably carried out at least largely perpendicular to the circuit substrate.

Another embodiment provides that the key module comprises a plunger and a compression spring, the damping element being the compression spring or being arranged and/or formed on the compression spring. The plunger is movably arranged in the key module and the compression spring is compressible and expandable in the key module, wherein a movement of the plunger is associated with a compression or expansion of the compression spring. The compression or expansion of the compression spring is the first or second actuating movement of the damping element (if the compression spring is the actuation element) or corresponds to the first or second actuating movement of the damping element (if this is arranged and/or formed on the compression spring).

In the case of a key module, the compression spring substantially fulfills the function of a resetting element, which resetting element returns the key module to a starting position (rest position) after an actuation by an operator and holds it in this position until a key press is carried out. During a key press, the compression spring is compressed by external forces. This movement results in a movement of the damping element and thus in damping of the planar coil. When the key press ends, the force acting on the compression spring also ends, so that it expands. This movement also results in a movement of the damping element and thus in damping of the planar coil. The actuating movement of the damping element preferably takes place at least largely perpendicular to the circuit substrate.

If the damping element is the plunger (as shown in FIG. 5) or the compression spring itself, the number of components of the device according to the invention is advantageously reduced. This also reduces the use of expensive automation technology in the manufacture of the key modules, and the manufacturing costs drop.

The keyboard according to the invention comprises one or more, preferably a plurality of devices according to the invention. The advantages of this keyboard over conventional keyboards emerge from the explanations given above and below on the device according to the invention.

In a further development, the keyboard has an underside and an upper side opposite the underside, the underside and/or the upper side being formed from metal or having a metallic layer or a metallic additional layer or a metallic insert. As a result, external interference on the impedance of the planar coils and/or the LC resonance circuits inside the keyboard, for example based on cell phone radiation or metallic objects, in particular in the vicinity of the keyboard, can be shielded.

The method according to the invention for detecting a key press of a key module of a keyboard with a device according to the invention comprises the steps of:

- carrying out the first actuating movement or the second actuating movement of the damping element, wherein the distance between the damping element and the planar coil changes and the planar coil is damped by the damping element as a result;
- outputting at least one electrical signal when carrying out the first actuating movement and/or the second actuating movement.

The advantages of the method emerge from the explanations given above and below on the device according to the invention.

A further development of the method provides that a physical parameter of the planar coil that changes during the damping by the damping element is detected and/or processed. Furthermore, the at least one electrical signal is output and/or the signal strength of the at least one electrical signal is changed as a function of the change in the physical parameter when a change limit value for the physical parameter is reached or exceeded.

In other words: A value of at least one physical parameter of the planar coil is measured during the entire actuating movement of the damping element. This can be an electrical voltage and/or an electrical current strength and/or a frequency. Among other things, all measurable parameters of an LC resonance circuit can be understood by this. However, other known electrical parameters can also be measured.

The electrical signal is triggered as soon as the measured parameter reaches or exceeds a change limit value (threshold value). This can be the case at any time during the movement of the damping element or also at the end points of the movement. One or more change limit values can preferably be predetermined. Further preferably, one or more change limit values is/are adjustable, as already explained above with reference to the device according to the invention. Alternatively or additionally, it can also be provided to change the signal strength of the at least one electrical signal as a function of the change in the physical parameter and thus, for example, to implement the joystick function already mentioned.

According to a development, it is provided that the signal strength of the at least one electrical signal changes as a function of the position of the damping element in the key module.

A further development provides that the damping element is moved perpendicular to the circuit substrate and/or to the planar coil during the first and/or second actuating movement.

It can also be provided that a distance between the damping element and the circuit substrate and/or the planar coil changes during the first and/or second actuating movement.

An embodiment of the method provides that the damping element is a plunger of the key module or the damping element is arranged and/or formed on a plunger of the key module and the planar coil is damped by the movement of the plunger by the damping element.

Another embodiment of the method provides that the key module comprises a plunger and an auxiliary actuator, the damping element being the auxiliary actuator or being arranged and/or formed on the auxiliary actuator and a movement of the plunger triggering a movement of the auxiliary actuator and the planar coil is damped by the damping element by the movement of the auxiliary actuator.

Another embodiment of the method provides that the key module comprises a plunger and a compression spring, the damping element being the compression spring or being arranged and/or formed on the compression spring and a movement of the plunger being linked to a compression or expansion of the compression spring, and the planar coil being damped by the damping element by the compression or expansion of the compression spring.

BRIEF DESCRIPTION OF THE DRAWINGS

The invention is explained in more detail below also with regard to further features and advantages on the basis of the description of embodiments and with reference to the accompanying schematic drawings, in which.

Corresponding parts and components are each provided with the same reference signs in all figures.

DETAILED DESCRIPTION

Figure 1:
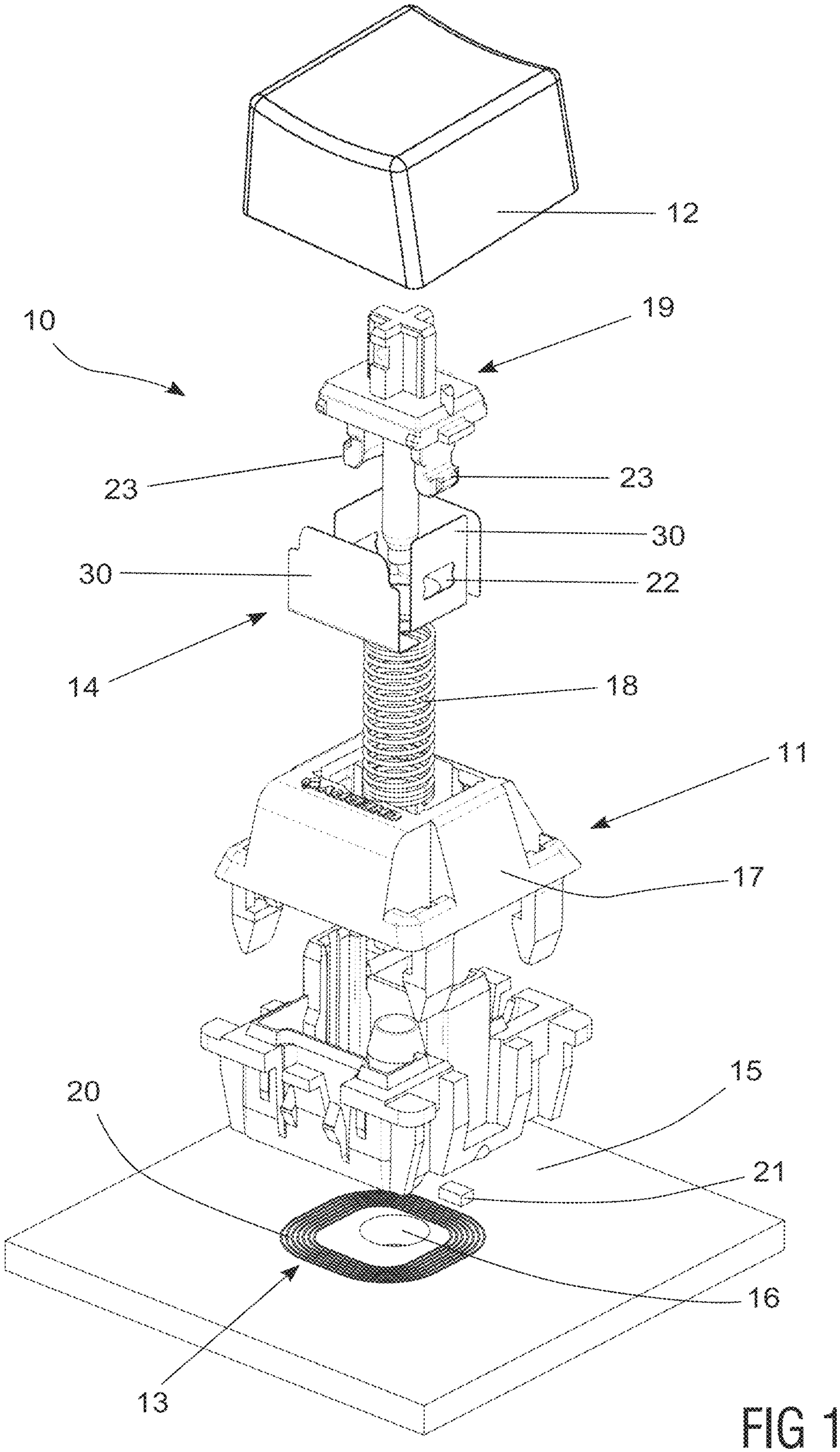
FIG. 1 is a perspective exploded view of an embodiment of the device according to the invention.

FIG. 1 shows a perspective exploded view of an embodiment of the device 10 according to the invention. The device 10 comprising a key module 11, a circuit substrate in the form of a printed circuit board 15, a planar coil 13, and a damping element 14. The planar coil 13 is arranged on the upper side of the printed circuit board 15. In the printed circuit board 15, a bore 16 is provided for centering and fastening the key module 11 to the upper side of the printed circuit board 15. The key module 11 comprises a plunger 19 and a two-part housing 17. Alternatively, however, a one-piece housing or no housing is also possible.

A compression spring 18 is arranged inside the housing 17. The compression spring 18 serves to move the plunger 19 into a starting position or to hold it there until a key press is carried out. For this purpose, the plunger 19 is movably arranged in the key module 11. The compression spring 18 is compressed by pressing a key cap 12, placed on a free end of the plunger 19.

The damping element 14 shown in FIG. 1 consists of a ferromagnetic metallic material. Furthermore, the damping element 14 is designed as a bent part. It has a horizontal surface 25 and four further surfaces 30 running perpendicular thereto. Furthermore, the damping element 14 has two opposing recesses 22 on two of the further surfaces 30, which are opposite one another, for mechanical, in particular form-fitting, attachment to the plunger 19 of the key module 11. Two opposite lugs 23 are formed on the plunger 19 for engaging in the recesses 22 of the damping element 14.

Figure 2:
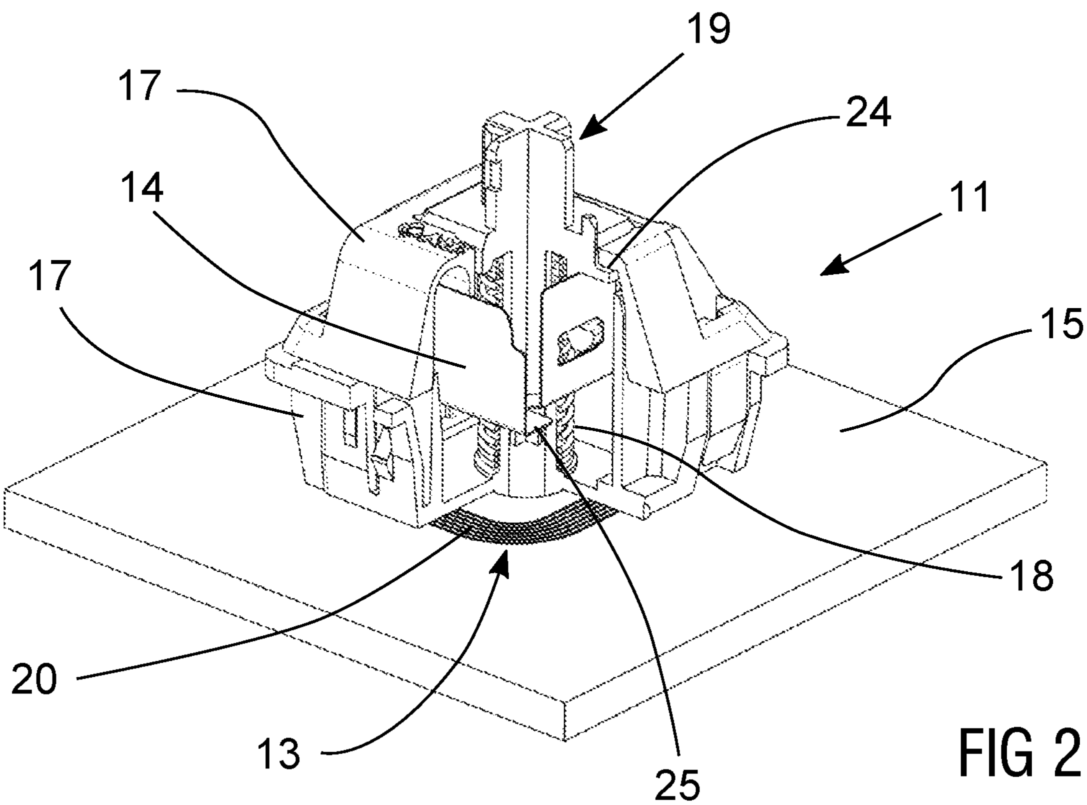
FIG. 2 is a partial sectional view of the device from FIG. 1, wherein the damping element is in its rest position.
Figure 3:
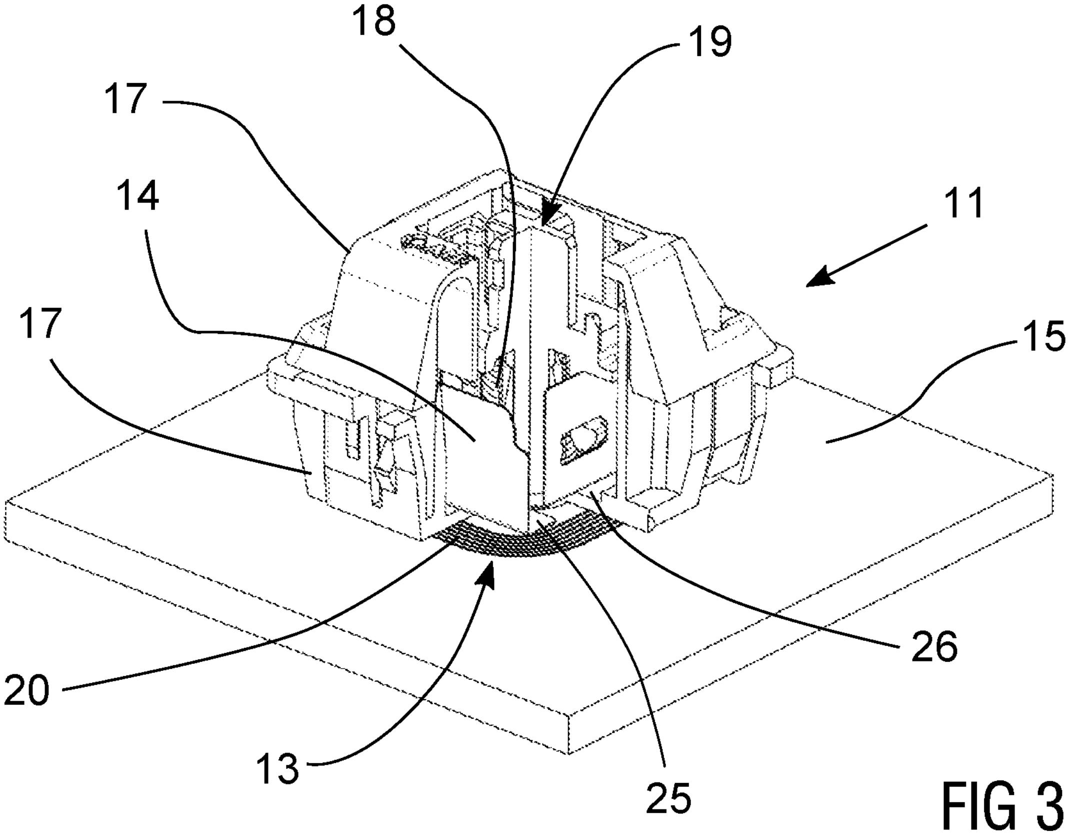
FIG. 3 is a partial sectional view analogous to FIG. 2, wherein the damping element is now in its actuation position.

During a first actuating movement of the damping element 14 from a rest position shown in FIG. 2 in the direction of an actuation position shown in FIG. 3, triggered by a pressure on the plunger 19, the damping element 14 approaches the printed circuit board 15 and thus the planar coil 13 perpendicularly, the distance between the actuation element 14 and the planar coil 13 decreases, the planar coil 13 is damped by the movement of the damping element 14. In the event of a reversed second actuating movement of the damping element 14 from the actuation position into the rest position, the damping element 14 moves away from the printed circuit board 15 and thus from the planar coil 13. The distance between the damping element 14 and the planar coil 13 increases, the planar coil 13 is damped by the movement of the damping element 14.

A physical parameter of the planar coil 13 that changes due to the damping is detected and/or processed by a control and/or monitoring device (not shown in the figures). For example, an electrical voltage can be measured. When a change limit value (threshold value) is reached or exceeded, at least one electrical signal is triggered by the control and/or monitoring device, which signals the actuation or the end of the actuation of the corresponding key. Alternatively or additionally, a strength of the at least one output signal can also be changed.

The planar coil 13, which is arranged on the upper side of the printed circuit board 15, has a plurality of complete windings 20, specifically seven, which are arranged one inside the other in a spiral shape on a plane. Each winding is substantially square in shape with rounded corners. Overall, the planar coil 13 thus also has a square shape with rounded corners. The shape of the windings 20 and of the planar coil 13 as a whole is adapted to the shape and dimensions of the key module 11.

Furthermore, an LED 21 for illuminating the key module 11 is arranged on the upper side of the printed circuit board 15. It can be a single-color or multi-color LED 21, so that color gradients can be implemented. The LED 21 is arranged on the upper side of the printed circuit board 15 in such a way that it is still within the housing 17 of the key module 11.

FIG. 2 shows the device 10 according to the invention in the rest position 27 of the damping element 14 and the starting position of the key module 11 or the starting position of the plunger 19. The compression spring 18 presses the plunger 19, with which the damping element 14 is positively connected, against an upper stop 24 of the housing 17 of the key module 11. Without an external force acting on the plunger 19, the plunger remains at the upper stop 24 due to the compression spring 18. Only when the plunger 19 is pressed, the plunger 19 is brought into its pressed position and the damping element 14 is brought into the actuation position shown in FIG. 3. In the rest position, the damping element 14 arranged on the plunger 19 is at a greater distance from the printed circuit board 15 than in the actuation position. The horizontal surface 25 of the damping element 14 is at a maximum distance from the printed circuit board 15 and at the same time from the planar coil 13. The damping element 14 damps the planar coil 13 only slightly or not at all because of the distance from the printed circuit board 15.

In FIG. 3, the key module 11 and the plunger 19 are shown in a pressed position and the damping element 14 is shown correspondingly in an actuation position. The distance between the horizontal surface 25 of the damping element 14 and the printed circuit board 15 and at the same time from the planar coil 13 is minimal. The movement of the plunger 19 with the damping element 14 is limited by a lower stop 26 (bottom) of the housing 17 of the key module 11. The compression spring 18 is maximally compressed in the pressed position of the key module 11. The planar coil 13 is significantly more strongly damped in the actuation position of the damping element than in the rest position and a change in a physical parameter, for example an electrical voltage, is measured accordingly. This change takes place continuously during the actuating movement of the damping element 14. When a change limit value (threshold value) is reached or exceeded during the actuating movement of the damping element 14, at least one electrical signal is triggered. As an alternative or in addition, the strength of the electrical signal output can also be changed, preferably in accordance with the changing position of the damping element 14 relative to the planar coil 13. When the pressing of the key ends, the plunger 19 is moved back into the starting position by the force of the compressed compression spring 18 and analogous processes take place. The plunger 19 of the key module 11 can then be actuated again.

Figure 4:
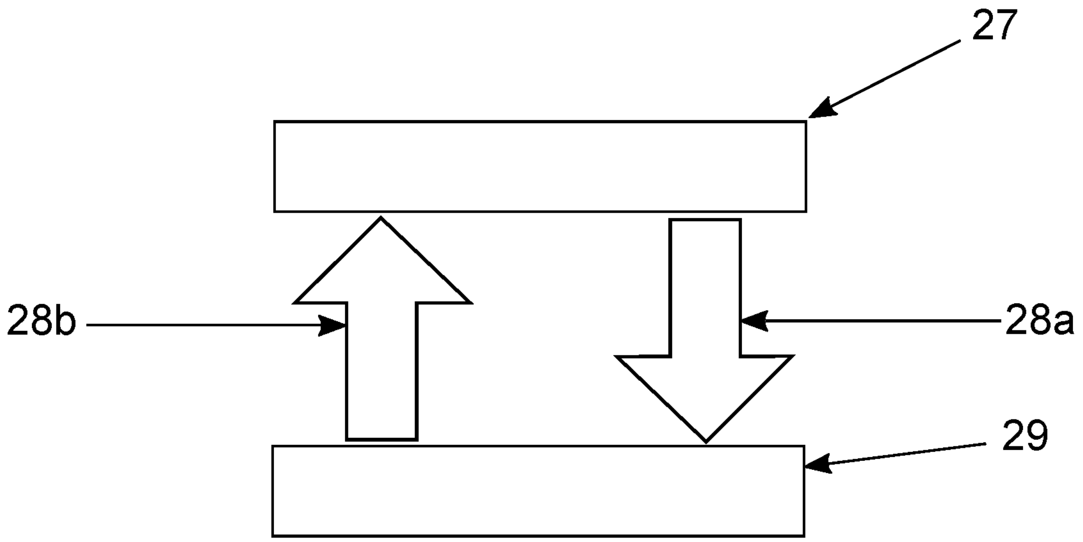
FIG. 4 is a schematic representation of the method according to the invention for detecting a key press of a key module.
Figure 5:
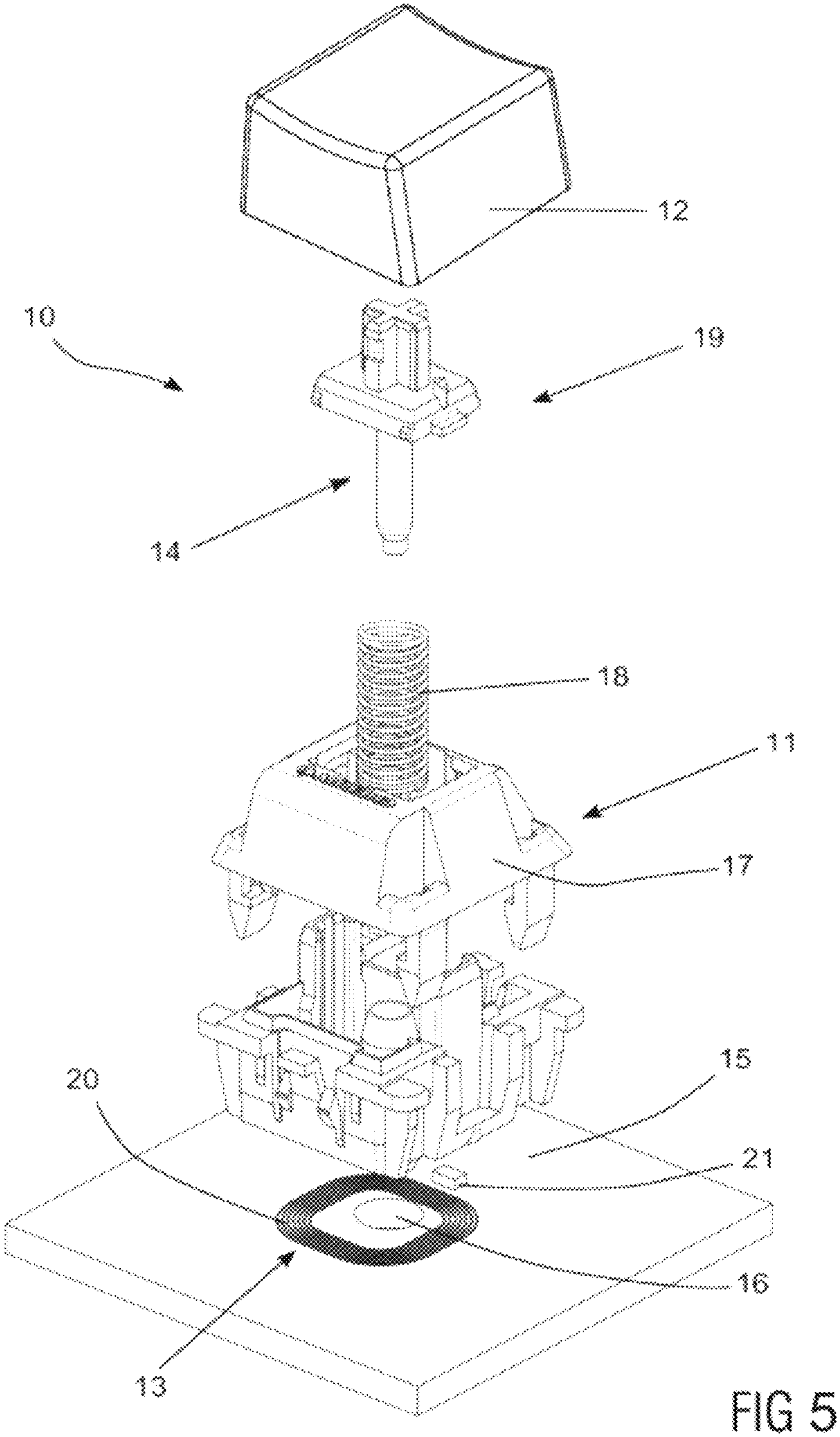
FIG. 5 is a perspective exploded view of another embodiment of the device according to the invention.

FIG. 4 illustrates the method according to the invention for detecting a key press of a key module 11. The rest position of the damping element is denoted by reference sign 27. The key module 11 is in its starting position; there is no compressive force acting on the plunger 19 from above. The compression spring 18 adopts the form that is as relaxed as possible and holds the plunger 19 with the damping element 14 against the upper stop 24. The damping element 14, in particular the horizontal surface 25 of the damping element 14, is at the greatest possible distance from the printed circuit board 15 and/or the planar coil 13. The planar coil 13 is not or is hardly damped in this state.

The actuation position of the damping element 14 is denoted by reference sign 29 in FIG. 4. The key module 11 is in its depressed position. When the key and thus the plunger 19 are pressed by an operator, the key module is moved from its starting position into its pressed position. The damping element 14 is thereby moved from its rest position 27 into its actuation position 29 by the first actuating movement 28*a* shown symbolically in FIG. 4. If the pressure on the key and thus the plunger 19 decreases or disappears completely, the plunger 19 is moved from its depressed position to its starting position due to the restoring force emanating from the compression spring 18 and the damping element 14 is thereby moved from its actuation position 29 into its rest position 27 by the second actuating movement 28*b*, shown symbolically in FIG. 4. The restoring force of the compression spring 18 is at least sufficiently great that the plunger 19 only reaches the starting position as a result of this restoring force. At the same time, the compression spring 18 has the effect that the key module 11 can only be actuated with the application of a specific force.

During the first actuating movement 28*a*, the plunger 19 with the damping element 14 is moved from its rest position 27 in the direction of the actuation position 29. The damping element 14 continuously approaches the printed circuit board 15 and the planar coil 13. "Approaching" is to be understood as a reduction in the distance between the damping element 14 and the planar coil 13. The closer the damping element 14 and in particular the horizontal surface 25 of the damping element 14 comes to the planar coil 13, the greater the influence of the damping element 14 on the physical parameters of the planar coil 13. As a specific example, it can be stated that an electrical voltage which is applied to the planar coil 13 changes as the damping element 14 approaches.

The actuation position 29 is that position of the damping element 14 in which the change limit value (threshold value) of the measured physical parameter is reached or has already been exceeded and thus at least one electrical signal is triggered or has already been triggered. The specific switching point is not defined by a mechanical stop in the key module 11. Rather, the switching point is dependent on the defined or set change limit value (threshold value). Thus, the damping element 14 and thus also the plunger 19 of the key module 11 can also be moved beyond the switching point until the actuation position is reached with a corresponding change limit value. The movement of the plunger 19 and thus of the damping element 14 is finally limited only by the lower stop 26 of the key module 11. The same applies analogously to the second actuating movement 28*b*, by means of which the damping element 14 is moved back into its rest position 27 and the plunger 19 is moved back into its starting position.

LIST OF REFERENCE SIGNS

10 Device
11 Key module
13 Planar coil
14 Damping element
15 Circuit substrate, designed as a printed circuit board
16 Bore
17 Housing
18 Compression spring
19 Plunger
20 Winding
21 LED
22 Recess
23 Lug
24 Upper stop
25 Horizontal plane
26 Lower stop
27 Rest position
28*a* First actuating movement
28*b* Second actuating movement
29 Actuation position
30 Further surface

The invention claimed is:

1. A device for detecting a key press of a keyboard, comprising a key module, a circuit substrate, a planar coil arranged on or in the circuit substrate, and at least one damping element, wherein the at least one damping element for damping the planar coil is movably arranged in the key module between a rest position and an actuation position, wherein the damping element executes a first actuating movement during the movement in a direction of the actuation position and executes a second actuating movement during the movement towards the rest position, and wherein the device outputs at least one electrical signal when carrying out the first actuating movement and/or the second actuating movement, wherein the key module is arranged on the circuit substrate, wherein the key module has a housing and a plunger that is movable relative to the housing, wherein the plunger is movable between a starting position and a pressed position, wherein the plunger is held in the starting position by a resilient means, wherein the resilient means is not said damping element, wherein a key cap for actuation arranged at a free end of the plunger, wherein, upon pressing of the key cap, the plunger is moved from the starting position in a direction of the pressed position, whereby the resilient means being tensioned in this process, wherein, without pressure on the key cap, the plunger is moved back towards the starting position by the tensioned resilient means, wherein the damping element is the plunger or the damping element is arranged and/or formed on the plunger, wherein the movement of the plunger being the first or second actuating movement of the damping element or corresponding to the first or second actuating movement of the damping element, wherein, in the starting position of the plunger, the damping element is in the rest position, and wherein, in the pressed position of the plunger, the damping element is in the actuation position.

2. The device according to claim 1, characterized in that the device comprises at least one control and/or monitoring device for detecting and/or processing at least one physical parameter of the planar coil, which parameter changes during the damping by the damping element, and the control and/or monitoring device is set up in such a way that when at least one change limit value of the physical parameter is reached or exceeded, the at least one electrical signal is output and/or that a signal strength of the at least one electrical signal changes as a function of the change in the physical parameter.

3. The device according to claim 2, characterized in that the change limit value or the change limit values are adjustable.

4. The device according to claim 2, characterized in that the control and/or monitoring device is set up in such a way that the signal strength of the at least one electrical signal is dependent on a position of the damping element in the key module.

5. The device according to claim 1, characterized in that the damping element consists of a ferromagnetic or paramagnetic material or at least in some regions comprises a ferromagnetic or paramagnetic material.

6. The device according to claim 1, characterized in that the damping element forms a horizontal surface which, in the actuation position, is aligned parallel to the circuit substrate and/or to the planar coil.

7. The device according to claim 6, characterized in that the damping element forms at least one further surface which extends perpendicularly or at an acute or obtuse angle to the horizontal surface.

8. The device according to claim 6, characterized in that a distance between the horizontal surface of the damping element and the circuit substrate and/or the planar coil changes during a vertical movement of the damping element.

9. The device according to claim 1, characterized in that the damping element can be moved perpendicular to the circuit substrate and/or to the planar coil during the first and second actuating movements.

10. A keyboard comprising one or more devices according to claim 1.

11. The keyboard according to claim 10, characterized in that the keyboard has an underside and an upper side opposite the underside, the underside and/or the upper side being formed from metal or having a metallic layer or a metallic additional layer or a metallic insert.

12. A method for detecting a key press of a key module of a keyboard with a device according to claim 1, comprising the steps of:

carrying out the first actuating movement or the second actuating movement of the damping element, wherein a distance between the damping element and the planar coil changes and the planar coil is damped by the damping element as a result;

outputting at least one electrical signal when carrying out the first actuating movement and/or the second actuating movement.

13. The method according to claim 12, characterized in that a) a physical parameter of the planar coil that changes during damping by the damping element is detected and/or processed, and b1) the at least one electrical signal is output when a change limit value of the physical parameter is reached or exceeded, and/or b2) a signal strength of the at least one electrical signal is changed as a function of the change in the physical parameter.

14. The method according to claim 12, characterized in that a signal strength of the at least one electrical signal changes as a function of a position of the damping element in the key module.

* * * * *